C. H. SPANGLER.
REVERSE PHASE SAFETY RELAY FOR MOTOR CIRCUITS.
APPLICATION FILED JUNE 4, 1913.
1,112,863.
Patented Oct. 6, 1914.
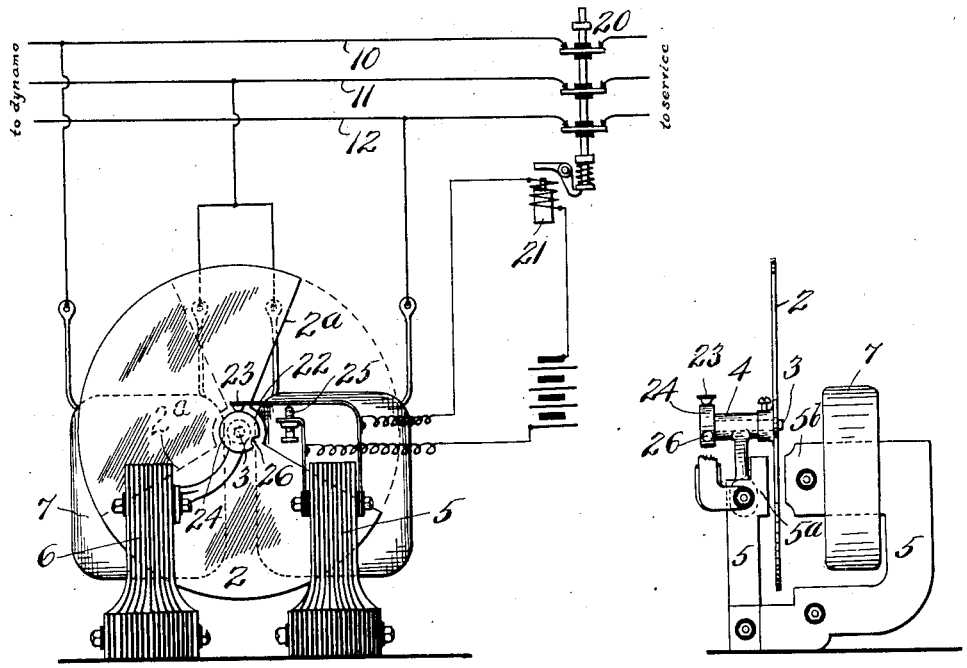
Fig. 1.
Fig. 2.
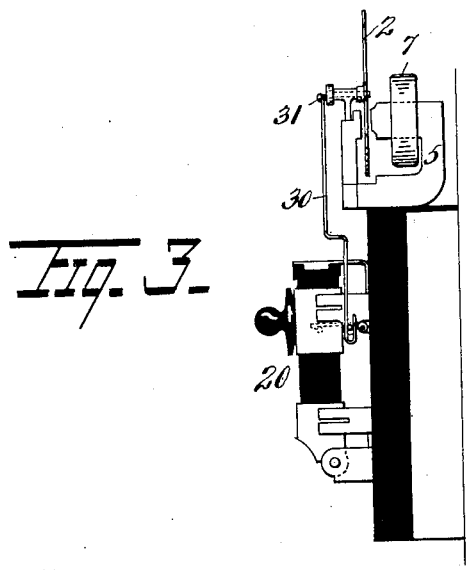
Fig. 3.

UNITED STATES PATENT OFFICE.

CHARLES H. SPANGLER, OF READING, PENNSYLVANIA.

REVERSE-PHASE SAFETY-RELAY FOR MOTOR-CIRCUITS.

1,112,863. Specification of Letters Patent. Patented Oct. 6, 1914.

Application filed June 4, 1913. Serial No. 771,608.

*To all whom it may concern:*

Be it known that I, CHARLES H. SPANGLER, a citizen of the United States, residing at the city of Reading, in the county of Berks and State of Pennsylvania, have invented certain new and useful Improvements in Reverse-Phase Safety-Relays for Motor-Circuits, of which the following is a specification.

My invention relates to means for protecting polyphase motor-driven elevators and like machinery from damage due to accidental reversal of phase; and it consists in the improved device fully described in connection with the accompanying drawings, the novel features of which are specifically pointed out in the claims.

The invention is particularly applicable to polyphase alternating-current motor circuits containing an overload circuit breaker, in connection with which it is illustrated in the accompanying drawings; and is embodied in a very simple mechanism comprising a swinging disk-segment which is actuated by two electro-magnets, energized by separate coils arranged in poly-phase connection with the line wires, so as to automatically operate the circuit breaker when the normal phases are accidentally reversed.

Figure 1 is an elevation showing my complete device in preferred form and in operating connection with the line wires and circuit breaker; the disk-segment being shown in normal operating position, but its reverse-phase position being also indicated by dotted lines. Fig. 2 is an elevation taken at right angles to Fig. 1. Fig. 3 indicates a modified operating connection between the disk-segment and the circuit breaker.

As shown, the disk-segment or air-gapped disk 2, of aluminum or like conductive but non-magnetic material, is fixed to a central pivot shaft 3 mounted in a suitable fixed bearing 4, so as to swing between the adjacent legs $5^a$, $5^b$, $6^a$, $6^b$, of two similar magnetic cores 5 and 6. The separate energizing coils 7, 7, for these cores, are connected in delta across three-phase to the line wires 10, 11, 12, as indicated in Fig. 1; so that the fluxes produced in the cores 5, 6 by the normal phase relation through the coils, will cause the disk-segment 2 to be swung to the position indicated in full lines, the extent of this turning movement being limited as indicated by a radial boundary line $2^b$ of the segment.

If the disk-segment 2 were a complete disk the torque of the magnetic cores $5^a$ $5^b$ and $6^a$ $6^b$, which repel in the same direction, would continually rotate the disk, but by having the air gap shown, between the boundary lines $2^a$ and $2^b$ this rotation is limited. It requires the combined action of both cores 5 and 6 to turn the disk, and in the position indicated in Fig. 1, which is the normal phase operation, the boundary line $2^b$ has reached a point at which the torque of core piece $5^a$ and $5^b$ no longer acts, the flux passing through without repellent action on the disk 2. In the reverse phase the line $2^a$ limits its turning in like manner.

When a reversal of phase occurs from any cause, and the changed flow of current through the coils 7, 7 causes the disk-segment 2 to promptly swing to the dotted position indicated in Fig. 1, such movement is arranged to automatically operate the main line circuit breaker indicated at 20, so as to shut off all flow of current until the cause of such reversal has been found and remedied. This is directly effected, as indicated in Fig. 1, by means of an electro-magnet 21 contained in an independent circuit which is normally held open by a spring contact arm 22. The end 23 of this arm normally bears upon a collar 24 of the disk shaft 3 so as to hold it clear of a fixed contact 25; but as soon as the disk is swung to the dotted position indicated in Fig. 1 because of a reversal of phase, said end 23 of the spring contact arm falls into a recess 26 of the collar 24, and closes the independent circuit so as to energize the magnet 21 and open the circuit breaker, 20.

My improved apparatus is very simple and inexpensive in construction and application, and may in some cases be advantageously mounted on the circuit breaker indicated in Fig. 3, a different operating connection is employed between the disk and the circuit breaker, consisting simply of a trip rod 30 for the latter, which is mechanically operated by the swing of the disk through a crank connection 31 to said disk.

What I claim is:—

1. In combination with a multi-phase alternating current motor circuit, a pair of magnetic cores, an air-gapped non-magnetic disk pivotally supported between said cores and rocked on its pivot by the combined action of said cores, said rocking movement being limited in either direction by the boundary lines of said air gap.

2. In combination with a multi-phase alternating current motor circuit containing a circuit breaker and a pair of magnetic cores, an air gapped non-magnetic disk pivotally supported between said cores and rockable in one direction by the normal phase relation in the motor circuit, and in the reverse direction by a change of phase relation in said circuit, and breaker opening means operated by said reverse swing of the disk.

3. In combination with a multi-phase alternating current motor circuit containing a circuit breaker; a reverse phase operating device for said breaker comprising two magnetic cores having separate energizing coils in delta connection with the line wires, an air-gapped disk arranged to be swung in one direction by the combined action of the fluxes produced in said cores by a normal phase relation in said coils and in the other direction when the phases are reversed, and operating connections between said disk and circuit breaker whereby the latter is opened when the phases are reversed; the swinging movement of said air-gapped disk being limited by the boundary lines of said air gap.

In testimony whereof I affix my signature in presence of two witnesses.

CHARLES H. SPANGLER.

Witnesses:
ADAM L. OTTERBEIN,
W. G. STEWART.